United States Patent [19]
Elvander et al.

[11] 3,948,640
[45] Apr. 6, 1976

[54] METHOD OF CARRYING OUT HEAT-REQUIRING CHEMICAL AND/OR PHYSICAL PROCESSES

[75] Inventors: Hans Ivar Elvander; Ingvar Anton Olof Edenwall, both of Heisingborg, both of, Helsingborg; Karl Goran Gorling, Lidingo; Douglas Sewerin Ekman, Helsingborg, all of Sweden

[73] Assignee: Boliden Aktiebolag, Stockholm, Sweden

[22] Filed: Apr. 22, 1974

[21] Appl. No.: 462,958

[30] Foreign Application Priority Data
Apr. 30, 1973 Sweden............................. 7306063
Mar. 1, 1974 Sweden............................. 7402747

[52] U.S. Cl........................................ 75/11; 75/26
[51] Int. Cl.²....................... C21C 5/52; C22B 1/10
[58] Field of Search................................... 75/11, 26

[56] References Cited
UNITED STATES PATENTS
3,440,731 4/1969 Tuthill................................. 75/26
3,661,554 5/1972 Wijard....................................... 75/3

*Primary Examiner*—Peter D. Rosenberg
*Attorney, Agent, or Firm*—Stevens, Davis, Miller & Mosher

[57] ABSTRACT

A bed of coke or other material having a resistivity within the range of between $10^{-4}$ and 10 ohm m is heated in a reaction chamber by means of an induction coil surrounding said chamber. The heat is generated in the bed itself by passing through said coil an alternating current having a frequency of at most ten times the mains frequency. There is maintained between the least cross dimension (d) of the bed area and the penetration depth ($\delta$) of the inductive field a ratio determined by the relationship $$\frac{d}{\delta} = K(0.54 - 0.35 \cdot {}^{10}\log \rho),$$

where $k$ is a numerical value between 1.1 and 1.5.

58 Claims, 12 Drawing Figures

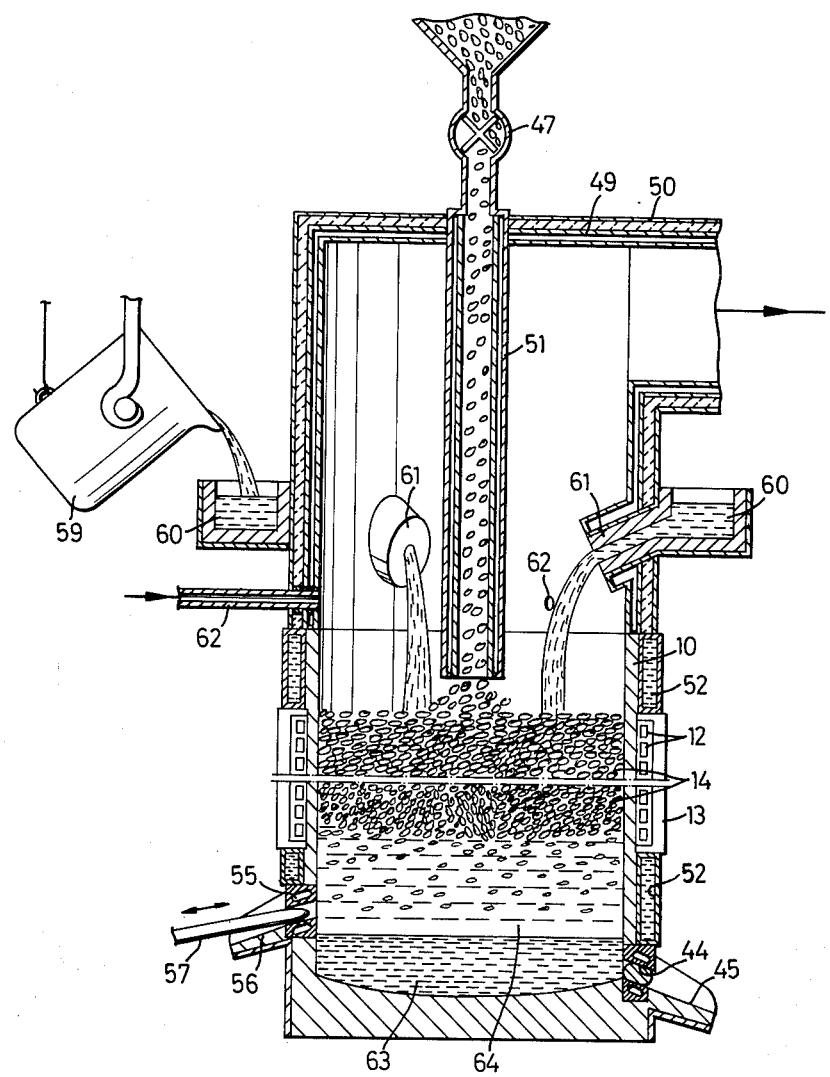

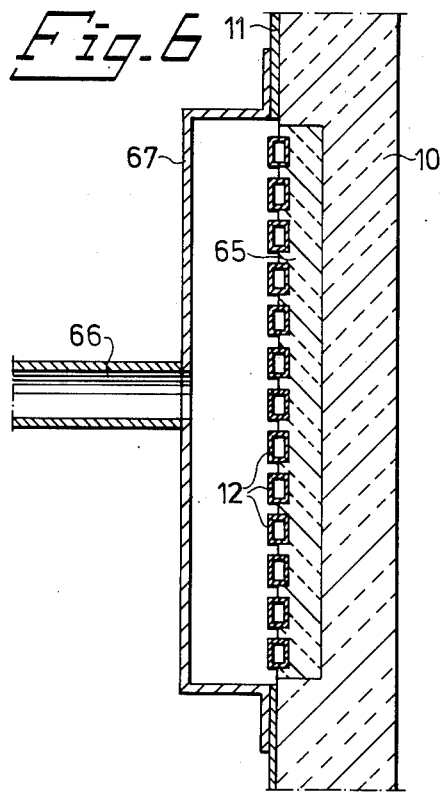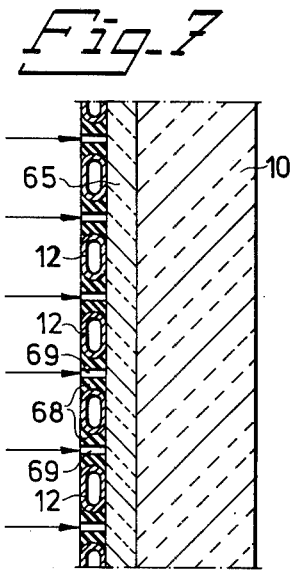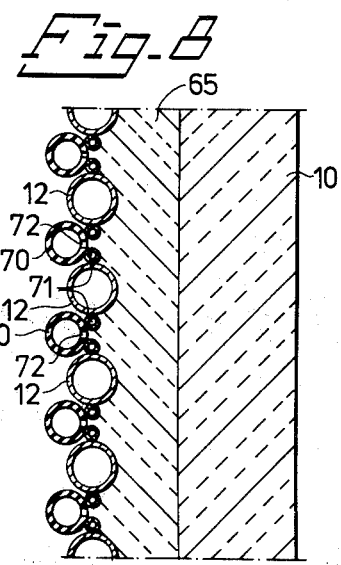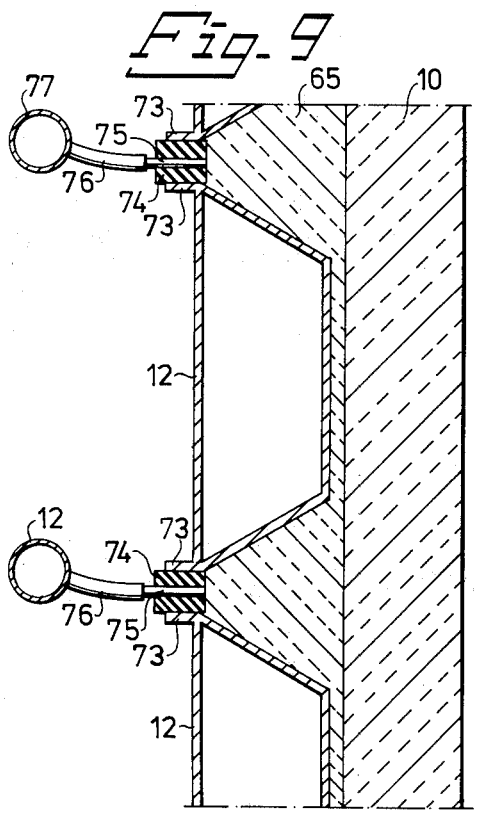

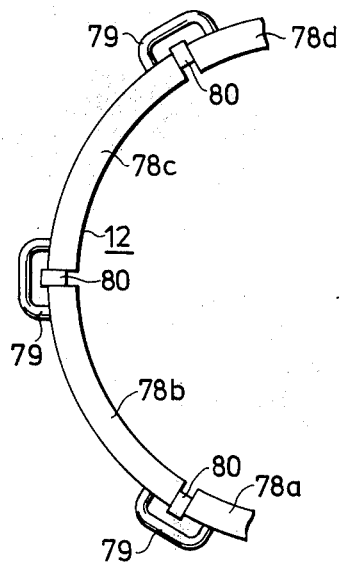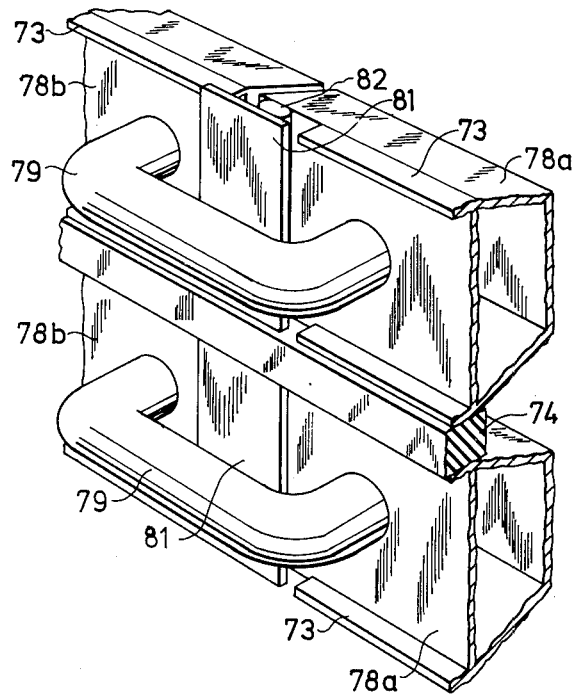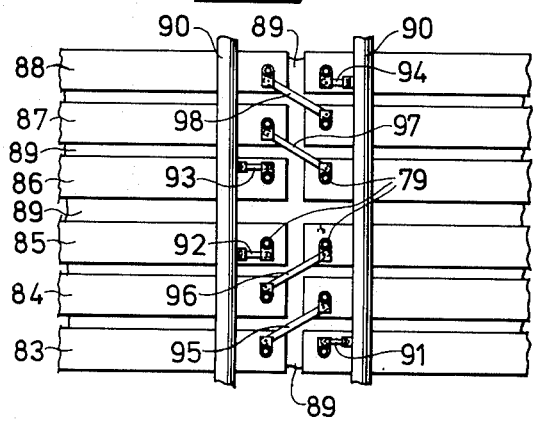

METHOD OF CARRYING OUT HEAT-REQUIRING CHEMICAL AND/OR PHYSICAL PROCESSES

The present invention relates to a method of carrying out heat-requiring chemical and/or physical processes in a reactor chamber in which there is a bed which is substantially made up of material taking part in the process, wherewith at least part of the energy required for said process is generated electroinductively in the bed itself while using at least one induction coil through which alternating current is arranged to pass and which is located externally of the reactor chamber.

The invention relates primarily to a method of carrying out heat-requiring processes in a bed of coke. Coke, which is produced from coal of varying age or from lignite or from coil produced by the pyrolysis of another organic material, is used within the art in a variety of different processes, during which the carbonaceous material is oxidized and/or is compounded or dissolved in another substance. Hereinafter by the term coke is meant all carbon material produced by the pyrolysis of organic material.

The heat required for the aforementioned processes can be supplied to the reactor chamber in a number of different ways. For example, the coke and other reactants may be pre-heated or heat may be generated in the reactor chamber by partially combusting the coke, or heat can be supplied through the walls of the chamber.

Other methods are based on the direct heating of coke or the reaction mixture electrically. This latter method often affords advantages over the aforementioned methods, despite a normally relatively high price for electrical energy per unit of energy. These advantages include less bulky apparatus for the actual process and for handling possible waste gases, a high degree of flexibility with respect to the manner in which the process is effected, an increased degree of selectivity with regard to the choice of starting materials possessing different properties, a high degree of efficiency with respect to the energy supplied to the process and an increased scope with respect to the economic size of the production apparatus.

A common method of developing electrical energy is to supply current through electrodes for heating the reaction mass by resistance heating or by electric arcs.

With another method electric currents are induced in the reaction mass or material by applying an electromagnetic alternating field over the mass, i.e. so-called inductive heating. Inductive heating has been proposed, among other things, for application in conjunction with the manufacture of coke from coal. Owing to the relatively high electric resistivity of the material, it has been assumed that it is necessary in such cases either to use an alternating field of high frequencies or to permit the material being heated to form the secondary winding of a transformer-like apparatus.

The utilization of high frequencies, however, creates certain limitations of a technical and economic nature. Furthermore, for practical reasons it is desired in many cases to avoid the transformer method, in which coal or some other material is placed in a chute to form a closed circuit.

It has now surprisingly been found that a particularly favorable result can be achieved from a technical and economic aspect when carrying out processes of the type mentioned in the introduction if, in accordance with the present invention, there is used a bed having a resistivity ($\rho$) within the range of between $10^{-4}$ and $10$ ohm m and a low frequency alternating current which is at most 10 times the mains frequency, preferably at most 5 times the mains frequency, and if there is maintained a relationship between the least cross dimension ($d$) of the bed area and the penetration depth ($\delta$) of the inductive field of between 0.2 and 2.5, preferably a value determined by the relationship $$\frac{d}{\delta} = k\,(0.54 - 0.35 \cdot {}^{10}\!\log \rho),$$

where $k$ is a numerical value between 1.1 and 1.5, preferably about 1.2. The term penetration depth is used in its accepted meaning, namely designating:

$$\delta = \sqrt{\frac{2\rho}{\omega \cdot \mu}}\,m$$

where $\omega$ is the angular frequency of electromagnetic field measured in radians per second, $\mu$ is the permeability (in the case of nonmagnetic materials about $4\pi \cdot 10^{-7}$) and $\rho$ is the resistivity of the bed measured in ohm $m$. The cross dimension $d$ of the bed area is measured in meters. Thus, in accordance with the invention it hs been found possible to carry out processes of the aforementioned type while using low frequencies, it being only necessary to increase the cross dimension of the bed to a relatively small extent in comparison with the dimensions required with known low frequency heating of material having a low resistivity. It can be mentioned by way of example that when inductively heating a coke bed having a resistivity of $10^{-2}$ ohm $m$ with an alternating current having a frequency of 100 Hz, it has been found that an induction coil with a diameter of only 7.5 m can be used fully satisfactorily with a ratio between the height and diameter of the coil of 0.6.

In accordance with the invention, it has been found that very high quantities of energy can be generated in a coke bed with an electromagnetic field of moderate strength. At the same time, the losses caused by inductive heating of the induction coil, if the coil is made of copper, have been found to reach only some few percent of the energy supplied. Thus, with the aforementioned example approximately 30 MW were generated in the coke bed at a field strength of only 50 kA/m; the losses in the copper coil reached only 600 kW, i.e. 2% of the energy supplied.

Thus, when utilizing in accordance with the invention this widened application of the inductive heating principle, which can be applied to heat lump material in beds having a resistivity in the region of 10 to $10^{-4}$ ohm m, the high resistivity which has previously been considered an obstacle has now been turned into an advantage.

When applying the method of the present invention, it is normal to use alternating current at mains frequency when desiring to take energy from the mains, since in this way it is possible to keep apparatus and operation costs low. If it is necessary to increase the frequency, it is convenient to pass through the induction coil an alternating current whose frequency is not greater than ten times the mains frequency, suitably a whole-number multiple of the mains frequency and preferably not greater than five times the mains frequency. Within the given ranges it is possible to obtain current of the desired frequency at low cost and with a high degree of efficiency, since it is possible to use inexpensive motors or turbine driven generators of simple construction; alternatively frequency multipliers or thyristor controlled current rectifiers can be used, for example, in those cases where excessively high power loads are not required.

In summary it can be mentioned that the following advantages are afforded in comparison with hitherto known techniques, when inductively supplying energy at low frequency or relatively low frequency to a bed having a resistivity in the region of 10 to $10^{-4}$ ohm $m$:

1. The power developed per unit of volume of relatively large reactors units can be considerably increased; therewith providing a highly productive reactor.

2. The penetration depth of the field is great in relation to the cross sectional area of the reactor, thereby providing a more uniform generation of energy over the cross-section of the reactor.

3. Quantities of energy hitherto not obtained can be developed inductively.

4. The electrical efficiency is greatly improved.

5. Apparatus for generating current of the desired low frequency are less expensive and of simpler construction and obtain high electrical efficiency; mains frequency can often be used.

When carrying out the method of the invention it is not necessary to provide all the requisite heat electroinductively. Thus, it lies within the framework of the invention to supply to the reactor chamber part of the heat required for the process by burning combustible substances in said chamber.

The invention can be applied to advantage when coking coal which, during the coking process, is preferably at least substantially continuously fed through the reactor chamber, the inductively produced heat being generated in a part of the material being coked and which has been practically completely freed from gasifiable constituents. Since the inductively produced heat is generated directly in the material being coked, a rapid coking process is obtained, whereby a significant quantity of coal can be coked per unit of time in a comparatively small apparatus.

The resulting coke is suitably discharged from the reactor chamber via a liquid lock, in which lock the coke is cooled, thereby avoiding many sanitary disadvantages. To improve the quality of the coked material, at least part of the coking gas and/or hydrocarbons charged to the reactor chamber can be arranged to pass through coked or substantially coked material which is located in the reactor chamber and which is maintained at least at the temperature required to crack the coking gas and hydrocarbons, thereby causing carbon to precipitate onto the coked material, to greatly increase the strength of the coke. In this way it is possible to produce a high-grade coke, such as metallurgical coke, from secondary raw materials.

Part of the heat required for the coking process can be supplied to the reactor chamber by combusting burnable substances directly therein, said combustion preferably being effected out of contact with the coked material. The combustible substances may comprise all or part of the gases formed during the coking process, although said substances may also comprise, either in full or partially, fuel, such as hydrocarbons, supplied to the reactor chamber from without. Heat generated directly in the reactor chamber by combustion can suitably be used for pre-heating and partially coking the coal charged to said chamber. Heat generated upon combustion of the combustible substances and not absorbed by the material in the reactor chamber can be recovered in the reactor chamber in a radiation portion of a steam boiler arranged adjacent the reactor, said radiation portion being located in the reactor chamber. Alternatively, at least part of the heat content of the gases formed in the coking reactor can be used to manufacture, e. g. steam or electrical energy. In the case of electrical energy, this can be produced to advantage with the present embodiment of the invention, and also with other embodiments thereof, with the aid of steam or gas turbines, suitably hot air turbines. The electrical energy thus produced can be used to supply the process and can be produced in the form of an alternating current at the frequency required by the process in question. Similarly, the still hot air departing from a hot air turbine can be used to effect the aforementioned combustion process in the reactor chamber, thereby providing the process with a high degree of thermal efficiency.

The invention can also be used to advantage in conjuction with the reduction and/or carburetion of a gaseous medium, e.g., for manufacturing reducing or protective gases, wherewith the gaseous medium, which may comprise, e.g. water-steam, circulating gases from reduction processes optionally admixed with hydrocarbons, etc., may be caused to pass substantially continuously through the inductively heated coke bed during the progressive consumption of the same. Similarly, in the case of coking it is possible with this method to achieve a very high output with a reactor of but modest dimensions, owing to the fact that the inductively generated heat is distributed relatively uniformly throughout the entire coke bed. The temperature of the bed is conveniently maintained at such a magnitude that the slag which is formed as coke is consumed in the bed is obtained in the form of a melt at the bottom of the reactor chamber, the slag melt being tapped from said chamber either intermittently or continuously. This facilitates the removal from the reactor chamber of residues formed as the coke is consumed. In order to maintain uniform conditions in the reactor chamber, it is convenient to replace the coke consumed in the coke bed substantially continuously. Replacement coke for the coke consumed in the bed can be produced in the reactor chamber, by supplying coal to the chamber and by coking the coal therein, thereby enabling the bed to be constructed of a cheap raw material and the quality of the formed coke to be improved in the manner described with reference to the coking of coal, while simultaneously utilizing in the process the hydrocarbons released during the coking process and/or supplied to the reactor chamber. To improve the heat economy of the process, the gaseous medium to be reduced and/or carbureted may be pre-heated by direct heat exchange with the reduced and/or carbureted gas. Similarly, part of the heat required for the coking operation and for the remainder of the process may be supplied to the reactor chamber by direct combustion of burnable substances therein or the heat which is developed upon combustion of the burnable substances and which is not taken up by the material and the gases in the reactor chamber can be recovered in or outside the reactor in the manner described above with reference to the coking of coal. The combustion process in the reactor chamber is carried out on that side of the coke bed from which the gaseous medium to be reduced and/or carbureted is introduced into the bed. In such cases it is particularly suitable from the aspect of gas travel and from the aspect of apparatus design to cause the gaseous medium to pass downwardly through the coke present in the reactor chamber. The physical heat content of the gases departing from the reactor may suitably be recovered by heat exchange between said gases and the gases charged to the reactor.

Another area in which the method of the invention can be applied to advantage, is the reduction and optional subsequent carbonization or carburetion of solid materials containing metal oxides, particularly materials containing iron oxides or calcium oxides. In this instance, the material is charged to the coke bed located in the reactor chamber and in which induction currents are generated, and at least the coke bed is maintained at a temperature of such magnitude that the metal oxide containing material passes through the bed during the progressive consumption of said bed and is reduced and melted and optionally carbonized or carbureted during its passage therethrough, wherewith the formed slag melt and metal or metal carbide melt is continuously or intermittently tapped off from the reactor chamber. This enables low-grade coke to be used without disadvantage and also enables a high and uniform temperature to be maintained in the whole of the coke bed, whereby the apparatus required for carrying out the process obtains a highly superior production capacity in comparison with previously known reduction and smelting apparatus. The method can be used to particular advantage for the final reduction of pre-reduced iron oxide materials, such as iron oxide material reduced to at least FeO. To enable the reduction ability of the reducing gases formed with the reduction process in the coke bed and also the reduction ability of any reducing gases formed by introducing liquid reduction agents into the coke bed to be used more effectively, the metal oxide containing material may be charged to the reactor chamber in such a finely divided state that said material, at least during the initial stage of its reduction, is held fluidized by the formed gases rising from the bed. The method is thus extremely suitable for use when reducing e.g. such fine metal oxide material as pyrite cinders. The solid, metal oxide containing material may, to advantage be charged to the reactor chamber in a hot or pre-heated state.

Owing to the differences in specific gravity of the metal or metal carbide melt and the slag melt, to which latter melt refining and fluxing agents may suitably be charged, the metal or metal carbide melt will pass through the slag melt and is collected in a zone located beneath the slag melt. The metal or metal carbide melt and the slag melt are suitably tapped off separately from the reactor. Particularly if the slag melt has a refining effect it is advantageous to retain a layer of molten slag beneath the coke bed, wherewith part of the heat required for the process may also be generated inductively in the slag melt.

The coke consumed in the coke bed is suitably replaced substantially continuously, e.g. by charging coal to the reactor chamber and by coking the coal therein. In other respects, the coal may be pre-heated and the coking process may be initiated by combusting burnable substances in the reactor chamber, the heat of the combustion gases being caused to act directly on the coal by radiation and convection. The combustible gases may comprise hydrocarbons supplied to the reactor chamber, either in the space above the charge or to the charge itself. For example, the hydrocarbons may be brought into contact with the coke and/or the coal being coked, the material being maintained at a temperature at least sufficient to crack the hydrocarbons and to cause carbon to be precipitated onto the coke. The heat generated by combustion of the burnable substances and not taken up by the material and gases in the reactor chamber can be recovered within or outside the reactor in the manner described with reference to the coking of coal.

The method of the present invention can also be applied in conjunction with the smelting of totally or partially metallic material in lump form or particulate form, e.g. pre-reduced metal oxides, such as sponge iron or metal scrap, such as iron scrap, particularly low-grade metal scrap, such as lathe cuttings and the like, said material and reducing agents for replacing consumed coke being charged to the reactor, in which the material is melted down electroinductively and the molten material passes through the inductively heated coke bed during the possible final reduction of oxidized portions of the material, and the molten metal is optionally carbonized during progressive consumption of the coke bed, the molten metal and resulting slag being obtained in a zone located beneath the coke bed, from which zone the metal and the slag are continuously or intermittently removed from the reactor chamber. If an inexpensive heat source is available, the solid metallic or substantially metallic material may be pre-heated before being charged to the reactor chamber and the material may also be charged together with a slag builder for refining the metal melt formed during the smelting process. Therewith it is possible to maintain a layer of molten slag beneath the coke bed, whereby heat can be generated inductively also in the slag melt. Coke consumed in the coke bed is replaced preferably substantially continuously, wherewith replacement coke may be formed by charging coal to the reactor chamber and by coking the coal therein in the aforedescribed manner. Hydrocarbons may also be charged to the reactor chamber, partly as fuel for generating part of the heat required to carry out the process, and partly to improve the quality of the coke formed from the coal in the aforedescribed manner. When burning combustible substances in the reactor chamber, the heat not taken up by material in the chamber can be recovered in a radiation portion of a steam boiler arranged adjacent the reactor, said radiation portion being located in said chamber, and at least part of the heat content of the gases formed in the reactor chamber can be used for producing electrical energy or steam.

The invention can also be applied to advantage in conjunction with the treatment of metal oxide melts. Thus, the invention can be applied to advantage in conjunction with the recovery of at least one metal, such as iron and silicon, from a melt containing said metal in oxide bound form, for example a slag, the melt being charged to the coke bed and the resident time for the melt in the bed and the temperature of the coke bed being adjusted so that said oxide-bound metal is reduced out during progressive consumption of the coke bed, and is obtained in molten form in a zone located beneath the coke bed, from which zone said melt, together with newly formed and possible residual slag, is tapped either continuously or intermittently and removed from the reactor chamber. The coke bed presents an extremely large hot contact surface of a reducing nature to the metal oxide melt, thereby affording a high reactor capacity. The metal melt and the slag melt may be tapped individually from the reactor. It is an advantage, particularly if the slag melt has a refining ability, e.g. created by the addition of suitable refining agents, to retain a layer of molten slag beneath the coke bed, wherewith a portion of the heat required for the melting process may be generated inductively also in the slag melt.

The coke consumed in the coke bed is replaced to advantage substantially continuously, which can be effected by charging coal to the reactor chamber and coking said coal therein. Coking can be effected and excess heat formed upon combustion of burnable substances in the reactor chamber can be recovered in the manner described with reference to other embodiments of the method according to the invention.

As a result of the large contact surface presented by the hot coke bed according to the invention, the method of the invention may also be applied to advantage in conjunction with the recovery of at least one relatively volatile metal or metal compound, e.g. comprising or containing at least one of the metals zinc, lead, arsenic, antimony, cadmium and tin, from a melt containing one of said metals in oxide and/or sulphide form, e.g. a slag, such as a slag obtained in the smelting of copper ore, said melt being passed through the inductively heated coke bed and the residence time of the melt and the temperature of the coke bed being adjusted so that the metal oxide is reduced and the metal vaporized or the metal compound volatilized as the coke bed is progressively consumed. The vaporized metal or metal compound can be oxidized by the oxidizing combustion of burnable substances in the reactor chamber and recovered in oxide form from the combustion gases externally of the reactor. It is also possible to conduct the vaporized metal or metal compound from the reactor chamber and to recover the same in solid or in liquid form externally of the reactor chamber by condensating said metal or metal compound. If the melt also contains at least one oxide-bound relatively difficulty volatilized metal, such as iron and silicon, said metal can, at the same time, be recovered in the manner described with reference to the recovery of at least one metal from a melt containing said metal in oxide-bound form. Coke for replacing coke consumed in the bed may be charged or produced in the manner described above with reference to other embodiments of the process according to the invention. Tapping of metal melt and slag from the reactor chamber and the supply of additional heat to the chamber and to the charge therein, and also recovery of the unused heat content in the reactor chamber of gases or gas-forming substances formed in said chamber during the reaction process or optionally charged to said chamber, may also be effected in the manner described with reference to said other embodiments of the process according to the invention.

In reactors of the type envisaged here the electrical insulation between respective turns of the coil and, when applicable, between the part coils may create certain problems, if the reactor walls have a certain degree of permeability. Among other things, it has been found that carbon monoxide containing gas in certain instances is able to penetrate from the charge through the reactor wall and cause carbon to precipitate out, which can result in sparking on the coil. These problems will be accentuated in the case of extremely large, inductively heated reactors and furnaces, wherein it may be necessary to use voltages hitherto unused in induction heating techniques. One particularly serious disadvantage encountered with coils constructed in accordance with present day techniques is that in order to repair the coil it must be completely disassembled, which is an expensive process and which could not be accepted with the aforementioned methods from an operational and economic point of view.

It has been found possible, however, to avoid sparking in the induction coil to a surprisingly large extent, when the method of the invention is effected in a reactor, the reactor chamber of which is defined by wall members which separate the induction coil from said chamber and have a certain degree of gaps permeability, if there is passed to said wall members a gas which is under a pressure exceeding the highest pressure prevailing in the zone of said chamber located opposite the induction coil, and which is unable to establish electric conducting connection between the turns of the coil.

In accordance with one suitable method of procedure, the gas under pressure passed to the wall members may be prevented from departing in a direction away from said chamber. This can be accomplished in accordance with one example by enclosing at least the portion of the apparatus covered by the induction coil in a pressure chamber. The gas under pressure may be suitably passed to the wall members via the pressure chamber. In accordance with another example in conjunction with the first-mentioned method of procedure, the regions between adjacent coil turns may be sealed against the atmosphere surrounding the reactor, while the gas under pressure is supplied to said wall members inwardly of said sealed regions.

The risk of sparking between the turns of the induction coil cannot be totally eliminated, however. It has therefore been found advantageous to combine the aforementioned method of procedure with remedial steps which enable parts of an induction coil to be repaired without necessitating the total disassembly of the reactor. This can be effected by using an induction coil constructed of a plurality of elements which extend around the reactor through at most 180°.

It may also be to advantage to use an induction coil constructed of a plurality of part-coils. Further, each coil turn can be placed in one plane. In this way there is obtained separate single-turn loops which can be joined together to form part-coils having any number of turns. The advantages afforded by this arrangement reside in the fact that:

it enables a structurally simple design of the insulating seal between the coil turns between which gas is injected inwardly of the seal as described above, it affords the greatest conceivable possibility of adjusting the number of turns of the part-coils to the electrical characteristic of the heated medium.

it simplifies the division of the coil into elements and, at the same time, facilitates the exchange of said elements, and it enhances the possibility of taking up the expansion which normally occurs in the reactor during operation, while retaining the gas-tightness of said reactor.

A further advantage afforded with planar one-turn loops is that the loops can be joined together to form part-coils having a selected number of turns in such a manner that the voltage 0 occurs between the adjacent turns of two part-coils. This is possible if adjacent part-coils are given different winding directions and if, at the same time, adjacent ends of adjacent part-coils are connected to the same point in the current supply system.

This arrangement ensures that the gap located between two part-coils is not loaded with the high voltage corresponding to the voltage between the turns in a part-coil times the number of turns in said part-coil.

The aforementioned gas under pressure passed to said wall members will flow into the chamber accommodating the material being heated through said wall members, which are to a certain degree permeable to said gas. It is therefore important that the composition of the gas selected is not harmful to the nature of the heating process being effected.

When there is a risk that carbon will precipitate out in the wall members it may be to advantage to use a substantially inert gas whose oxygen or hydrogen potential is such that the precipitation of carbon is prevented in at least the portions of the wall members located adjacent the induction coil.

So that the invention may be more readily understood and other features thereof made apparent, a method according to the invention will now be described with reference to the accompanying drawing. The drawings show diagrammatically in vertical section a number of apparatus for carrying out different embodiments of the method according to the invention.

FIG. 5 shows an apparatus for handling melts, particularly slag melts, in accordance with the invention.

FIGS. 6–9 show in vertical section a portion of a reactor wall provided with four different devices for avoiding sparking in the induction coil.

FIG. 10 is a fragmentary plan view of an induction coil constructed of a plurality of elements having a small angle of arc.

FIG. 11 is a fragmentary view in perspective of an induction coil constructed substantially in accordance with FIGS. 9 and 10.

FIG. 12 is a fragmentary side view of two part-coils constructed of planar coil turns and energized in a preferred manner.

Coinciding or essentially coinciding elements in the apparatus illustrated in the Figures are identified by the same reference numerals.

Figure 1:
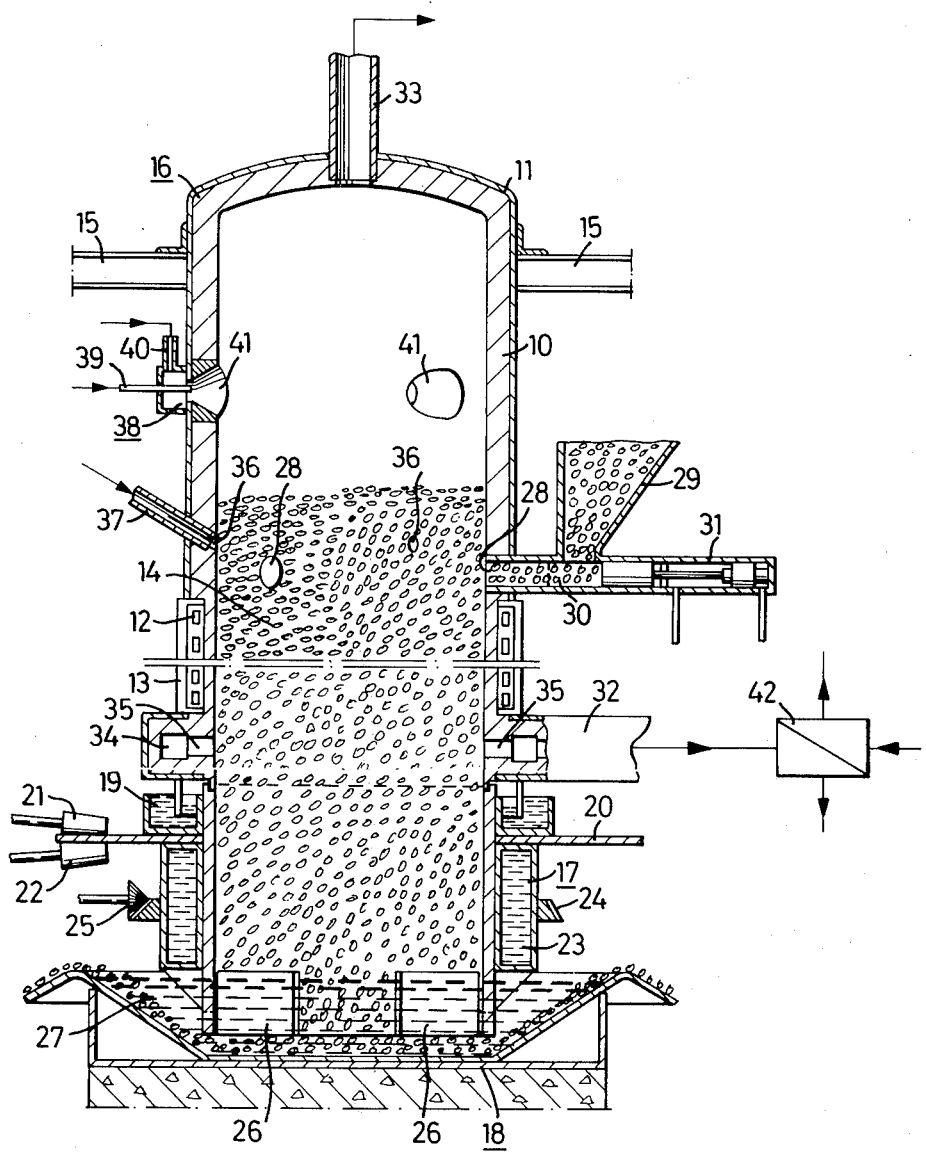
FIG. 1 shows an apparatus for coking coal in accordance with the invention.

In FIG. 1 there is shown a coking reactor, the walls of which are formed at least partially by a refractory lining 10 and a shell 11 made e.g. of sheet steel. Arranged around the reactor is an induction coil 12, with a yoke-structure 13 located externally thereof. The coil 12 is arranged to be through passed by an alternating current from a current source (not shown) and is arranged to serve to maintain a bed 14 comprising mainly coke and located in the reactor chamber radially inwardly of the coil at a temperature suitable for carrying out the process in question.

The reactor shown in FIG. 1 comprises a downwardly open upper portion 16 suspended in beams 15, a rotatable lower portion 17 and a stationary bottom portion 18. The lower portion 17 is connected to the upper portion 16 via a water lock 19 and is supported by a plurality of pairs of supporting and carrying rollers arranged to operate in conjunction with a ring-shaped flange 20, of which roller pairs one is shown at 21 and 22. The portion 17 is formed mainly of a cooling jacket 23 through which a liquid is arranged to pass and which on the outside thereof supports a gear ring 24 and is rotated by means of a motor driven gear wheel 25 arranged to mesh with said gear ring. The portion 17 is provided on the inside thereof with a number of discharge blades 26, which upon rotation of portion 17 are arranged to discharge the coked material through a space located between the portion 17 and the bottom portion 18. The bottom portion 18 is bowl-shaped and together with the lower most portion of the portion 17 forms a water lock 27.

When coking coal in the reactor shown in FIG. 1, the coal is charged to the reactor chamber through openings 28 located above the induction coil 12 and, as a result of the feeding effect afforded by the blades 26 sinks down through the reactor chamber past the level of the coil 12, where it is heated to coking temperature and forms the inductively heated bed 14. The coal charged to the reactor is coked to a substantial extent before reaching the level of the coil 12 as a result, inter alia, of conductive and radiant heat from the coke bed 14. The inductively produced heat is thus generated in part of the material being coked, which is substantially completely freed from gasifiable constituents. Before the coke leaves the reactor, it is cooled in the liquid lock 27 and also by the cooling jacket 23.

The coal is charged to the reactor chamber substantially continuously. With the illustrated embodiment, the coal is charged to the reactor chamber by means of a number of so-called stokers, each of which includes a trough 29 whose outlet discharges into a pipe 30, which in turn discharges into the reactor chamber at 28. Arranged at the end of the pipe 30 remote from the reactor chamber is a pressure cylinder 31, which is arranged to feed coal from the trough 29 to the pipe 30 and into the reactor chamber. Only one stoker and one outlet 28 from a second stoker is shown in FIG. 1.

The coking reactor has a lower and an upper discharge conduit 32 and 33 respectively, which can either be used singly or simultaneously for conducting away gas formed in the reactor during the coking process. The lower discharge conduit 32 is connected to the reactor chamber at a position beneath the induction coil 12, via a ring-shaped passage 34 and a number of openings 35. Arranged above the coil 12 is a number of pipes 37 which discharge at 36 and which are arranged to supply preferably liquid hydrocarbons to the coal being coked. In the space above the charge there is arranged a number of burners 38, which include a fuel supply pipe 39 and a pipe 40 for supplying oxygen-containing gas, such as air. The combustion gases from the burners 38, of which only one is shown in FIG. 1, pass into the furnace chamber via openings 41 which are directed so as to cause vortex movement in the space above the charge. Alternatively, only air or some other oxygen-containing gas need be supplied above the charge for combusting the gases formed during the coking process.

When only the upper discharge pipe 33 is used, wherewith the discharge pipe 32 is closed by means of a valve means not shown, the gases formed in the reactor chamber as the coal is coked pass upwards through the reactor chamber and out through the discharge pipe 33. For the purpose of pre-heating the coal and initiating the coking process, the coking gases formed during the coking process and passing up through the charge, together with any hydrocarbons which may be supplied through the pipes 37, are more or less completely combusted above the charge by means of the burners 38. The heat content of the gases departing through the discharge pipe 33 are suitably recovered for producing, e.g. steam or electrical energy.

When only the lower discharge pipe 32 is used, wherewith the discharge pipe 33 is held closed by means of valve means not shown, the gases formed during the coking process pass through openings 35, the ring-shaped passage 34 and the discharge pipe 32, and out of the reactor chamber. It is conceivable to maintain a certain, reducing combustion zone above the charge by means of burners 38, for the purpose of supplying part of the energy required by the coking process.

Hydrocarbons are supplied through pipes 37 and are cracked when passing through that portion of the bed 14 having a temperature which exceeds the cracking temperature of hydrocarbons, thereby causing carbon to precipitate onto the formed coke, the quality of which is thereby considerably improved.

The gases, which are rich in combustible substances, departing through the discharge pipe 32 can be combusted to advantage for generating electrical energy for the inductive heating of the actual coke bed 14. In accordance with the illustrated embodiment, the physical heat content of the gases departing through pipe 32 is recovered in an indirect heat exchanger 42.

Alternatively the gas is conducted away through both of the pipes 32 and 33; an oxidizing combustion process can be maintained to advantage in the reactor chamber above the charge, while ensuring that the oxidizing gases formed all leave the reactor chamber through the discharge pipe 33 and only a part of the coking gases and a part of the cracking gases formed by introducing hydrocarbons through pipes 37 depart through discharge pipe 32.

Figure 2:
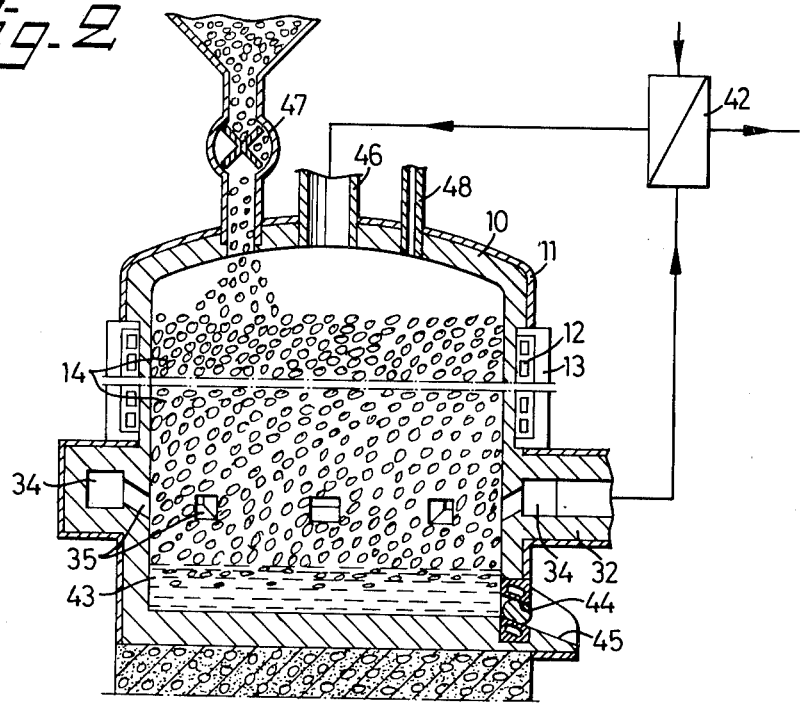
FIG. 2 shows an apparatus for reducing and/or carbureting gaseous media in accordance with the invention.

In FIG. 2 the reference numerals 10–14, 32 34, 35 and 42 have the same significance as in FIG. 1. With the reactor of FIG. 2, gaseous media are reduced and-/or carbureted by being brought into contact with the inductively heated coke bed 14, and a temperature of such magnitude is maintained in the reaction chamber that the residues of the coke consumed during the process are obtained in molten form in the lower portion of the reactor. The molten coke residue 43 is tapped off either continuously or, as shown, intermittently via a tapping hole 44 and a chute 45. The gaseous medium, e.g. water steam, to be reduced and or carbureted, is introduced through a pipe 46 subsequent to being subjected to heat exchange in the indirect heat exchanger 42, with reduced and/or carbureted gas departing from the reactor through the pipe 32, and leaves through the openings 35, which are directed obliquely downwardly to prevent coke from passing into the ring-shaped passage 34 to block the same. Coke or, alternatively, coal which during its passage towards the level of coil 12 is coked within the reactor chamber, is fed into the reactor chamber through a feed means 47, for replacing coke consumed in the bed 14.

If the material fed through the feed means 47 is coal, it will be coked during its passage towards the level of the coil 12, wherewith the coking gases, subsequent to being cracked in the bed 14, depart together with the reduced and/or carbureted gaseous medium through the pipe 32. If the coal is of poor quality, it is convenient to supply such quantities of hydrocarbons through pipe 48 and to maintain such conditions in the reactor chamber that the hydrocarbons, when cracked, give rise to carbon precipitation on the newly formed coke, thereby greatly improving the mechanical strength of the coke.

Figure 3:
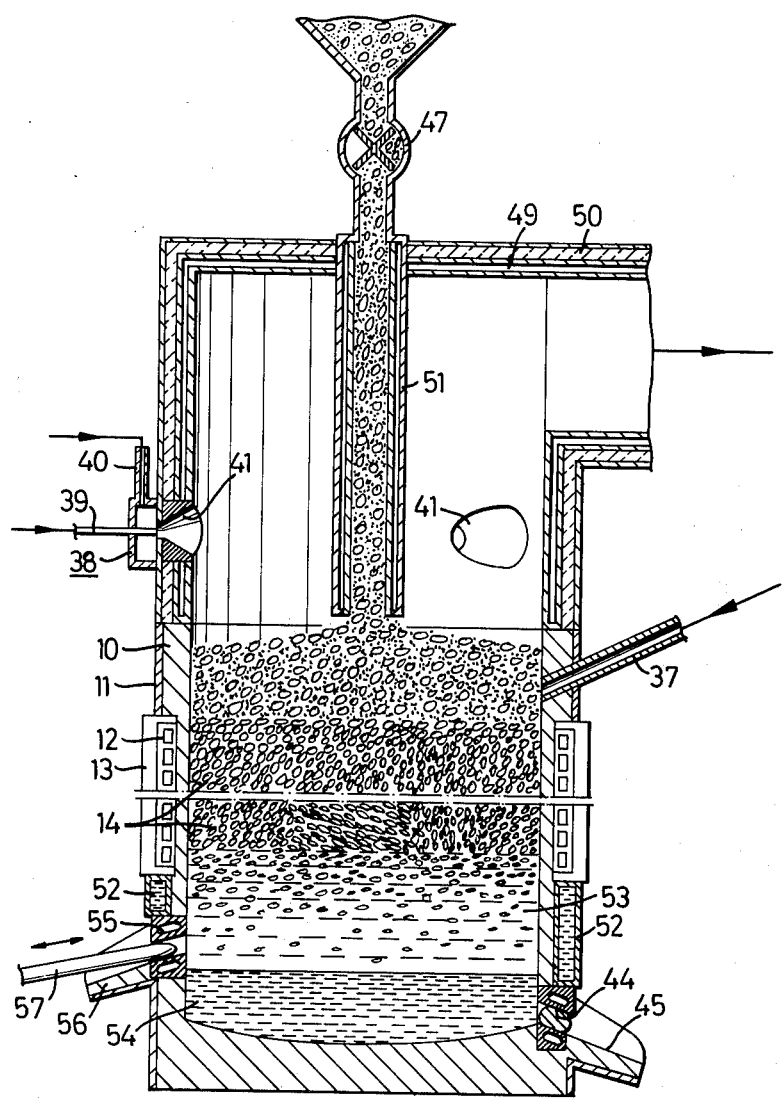
FIG. 3 shows an apparatus for reducing and optionally subsequently carbonizing or carbureting solid, metal oxide containing material in accordance with the invention.

FIG. 3 shows a reactor for reducing and melting iron oxide powder. The reference numerals 10–14, 37–41, 44, 45, and 47 have the same significance as in FIGS. 1 and 2 above. The upper portion of the reactor is constructed as the radiation portion of a steam boiler arranged adjacent the reactor. The steam boiler is not shown in the Figure. Thus, the upper portion of the reactor chamber is encircled by a jacket structure 49 through which water or steam is arranged to flow and which in turn is surrounded by a heat-insulating shell 50. The material supply pipe 51 extending downwardly from the feed means 47 is double-walled and, similarly to jacket 49, liquid or gaseous coolant is arranged to flow therethrough. The reactor wall located in the region beneath the coil 12 is cooled by means of a cooling jacket 52.

A material comprising iron oxide, coke or, alternatively, coal which is coked in the reactor chamber in the aforedescribed manner, and optionally a slag builder, is charged to the top of the bed through the pipe 51 which bed comprises mainly coke. Liquid or gaseous hydrocarbons may be introduced through pipe 37 to the charged material, which is pre-heated by means of burners 38.

The thus pre-heated iron oxide material is pre-reduced and metallized to a certain extent above the coke bed and is melted together with the slag building material in the upper portion of the induction zone, whereafter the iron oxide is finally reduced and carbonized during its passage through the coke 14 during progressive consumption of said bed. As the bed 14 is consumed it is re-built, however, to a corresponding degree by the coke or the coked coal charged to the process. The molten material is obtained beneath the bed in the form of a slag layer 53 and a carbonaceous iron layer 54. The iron may be tapped off intermittently through tapping hole 44 and chute 45. The slag is tapped off suitably substantially continuously through the tapping hole 55 and the chute 56. To this end, the tapping hole is provided with a movable stopper 57 which is driven by drive means (not shown) and which is so operated that the interface between the bed 14 and slag layer 53 is maintained at a desired level in the reactor chamber. The carbon monoxide containing gas formed during the reduction process, and also the residue of any hydrocarbons supplied through pipe 37 and possible coking gases are combusted by means of the burners 38 above the material charged to the reactor. The reactor shown in FIG. 3 can also be used to advantage for the final reduction and melting of pre-reduced iron oxide, e.g. sponge iron. The reactor of FIG. 3 can also be used for reducing and optionally carbonizing or carbureting another, solid metal oxide containing material, e.g. for manufacturing molten calcium carbide, calcium oxide and carbonaceous material being supplied through pipe 51.

Figure 4:
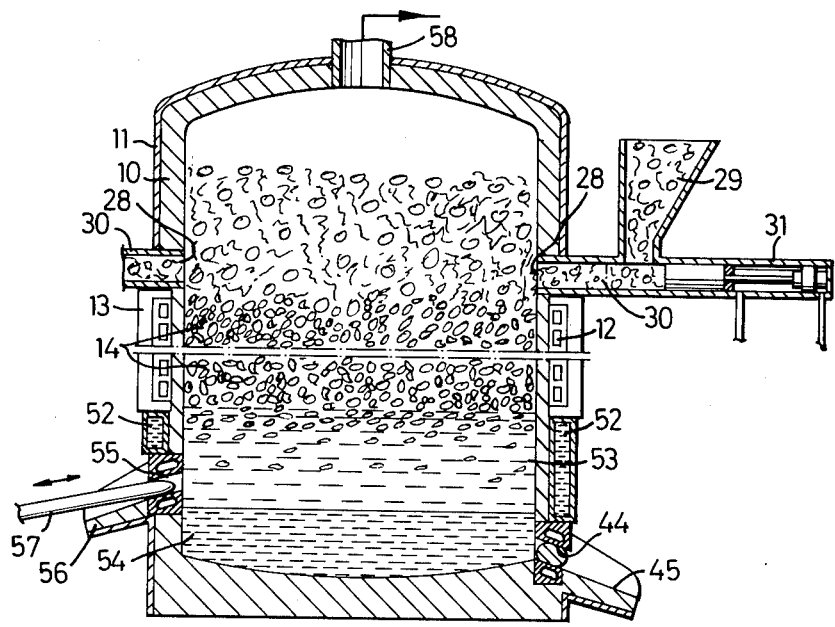
FIG. 4 shows an apparatus for melting scrap in accordance with the invention.

In FIG. 4, the reference numerals 10–14, 28–31, 44, 45, 52–57 have the same significance as in FIGS. 1–3, and the Figure shows a reactor for melting lump material which may be totally or partially metallic, particularly low-grade metal scrap, such as lathe turnings and the like. The scrap is charged together with coke or coal and optionally also together with a slag builder, by means of stokers 30, 31, onto the inductively heated coke bed 14. The scrap is melted above and in the bed 14 both inductively and by contact with the hot coke bed, wherewith molten coke ash and slag together with the molten and optionally refined scrap material is obtained as a molten layer 53 and 54 respectively beneath the bed 14. Formed gases depart through pipe 58. If coal is charged to the reactor chamber, it should be ensured that the coal is coked at least to a substantial extent before it reaches the bed 14. If desired, liquid or gaseous hydrocarbons can be charged to the charged material and the material may be pre-heated in the reactor chamber, by combusting burnable substances therein in the manner described with reference to FIGS. 1–3. The interface between the slag bath 53 and the coke bed 14 is held at the desired level by correspondingly tapping off slag through the tapping hole 55.

In FIG. 5, the reference numerals 10, 12–14, 44, 45, 47, 49–52 and 55–57 have the same significance as in FIGS. 1–4. The Figure shows a reactor for recovering at least one relatively easily volatilized metal or metal compound and at least one relatively difficultly volatilized metal from e.g. a slag melt. In the reactor there is maintained on a level with the coil 12 a coke bed 14, to which the slag melt is continuously or intermittently charged. With the illustrated embodiment, the slag melt is charged from a ladle 59 to a chute 60, from which the melt is distributed over the bed 14 through a number of distributing pipes 61 projecting into the reaction chamber. The bed is held at a temperature such that the readily volatilized metal or metal compound, e.g. zinc and/or lead in oxidic or sulphidic form, is vaporized and leaves the reactor chamber, optionally subsequent to being combusted by means of an oxygen containing gas, e.g. air, fed through feed pipes 62. The slag residue passed down through the coke bed 14, where the difficultly volatilized metal oxide, e.g. iron oxide, is reduced and carbonzied in contact with the bed during progressive consumption of said bed. The bed 14 is replenished at the same rate as it is consumed, by supplying fresh bed material through feed pipe 51, optionally together with a suitable slag builder. The reduced metal is obtained in the form of a lower, molten layer 63 at the bottom of the reactor, while the residue of the charged and formed slag is obtained in the form of a slag layer 64 located above the layer 63. The interface between the slag layer 64 and the coke bed 14 is held at the desired level by continuously or intermittently tapping off slag from the layer 64.

FIG. 6 shows a portion of a reactor wall, comprising a ceramic lining 10 and a shell 11. The reference numeral 12 identifies an induction coil which is arranged externally of the lining 10 and which is constructed from tubes which can be cooled by passing a cooling liquid therethrough. The coil 12 is partially embedded in a ceramic filling mass 65. Both the lining 10 and the filling mass 65 have a certain degree of gas permeability.

To prevent the passage of solid, liquid or gaseous material to the coil 12 from the side of the reactor wall opposite the coil, i.e. from the reactor chamber in which the material to be heated is accommodated, a pressure is maintained in the wall members 10, 65 on a level with the coil 12 by means of a gas, said pressure exceeding the highest pressure which prevails in the zone of the reactor chamber located opposite the induction coil. The gas selected is one which is unable to establish electrical conducting connection between the coil turns of the coil 12. The pressure is maintained by passing gas under pressure, for example air or a substantially inert gas, through a supply pipe 66 to a pressure chamber 67 surrounding the induction coil 12 and sealing the latter against the ambient atmosphere.

FIG. 7 also shows a portion of a reactor wall having a lining 10, filling mass 65 and induction coil 12. The regions between adjacent coil turns are sealed against the atmosphere surrounding the furnace by means of a sealing device 68 made of a suitable insulating material. Disposed in the device 68 is a number of apertures 69 through which gas under pressure is passed to the portions of the reactor wall 10, 65 located on a level with the coil 12, as shown by the arrows.

FIG. 8 shows an embodiment which, in principle, coincides with the embodiment of FIG. 7. A portion of a reactor wall comprising lining 10 and filling mass 65 is surrounded by a spirally wound induction coil 12. The seal between adjacent coil turns is provided by means of a similarly spirally wound hose or the like 70 made of an elastomeric material. For the purpose of obtaining small, and therewith more effective sealing abutment surfaces between the hose 70 and the coil 12, pipes 71 of small diameter are welded to said coil 12. The hose 70 also serves to supply gas under pressure to the wall members 10, 65 and, to this end, is coupled to a source of pressure medium (not shown) and is provided with gas outlet openings 72 directed towards the reactor wall.

FIG. 9 also shows a portion of a reactor wall comprising lining 10 and filling mass 65 and surrounded by an induction coil 12. Each coil turn has a parallel-trapezium cross-sectional shape and is provided at the top and bottom thereof with outwardly projecting flanges 73. Arranged between adjacent flanges 73 of adjacent coil turns are seals 74 which are made of an elastomeric material and which are provided with apertures 75 through which gas under pressure can be passed to the filling mass 65. A plurality of apertures disposed along the length of the coil turns are arranged in the seal 74 between sequential coil turns. Gas is passed to the apertures 75 through distributing pipes 76, which extend from a supply pipe 77 arranged to serve a number of distributing pipes 76.

FIG. 10 illustrates how each coil turn in a coil 12 can be constructed of several elements 78a to 78d which are suitably placed in one and the same plane and each of which embraces an angle below 180°. The reference numeral 79 identifies lines for conducting cooling liquid and optionally also current between adjacent elements 78a to 78d, while the reference numeral 80 identifies seal means arranged to seal between adjacent ends of said element 78.

FIG. 11 shows in more detail the connecting point between two adjacent elements 78a, 78b according to FIG. 10, said elements having substantially the construction shown in FIG. 9. The flanges 73 of one element 78a terminate short from the end of said element, while the other element 78b has a flange 81 which projects beyond the element 78a. Sealing between adjacent element ends is effected by means of a seal 82 clamped between the inside of flange 81 and the outside of element 78a, said seal 82 permitting a certain degree of movement between the elements 78a, 78b in their longitudinal direction.

FIG. 12 shows an induction coil which is constructed of two part-coils, each of which comprises three coil turns 83 to 85 and 86 to 88, respectively. Each coil turn is arranged in one and the same plane and can be divided into elements in the manner shown in FIG. 10. Seals 89 are arranged between the meeting ends of each coil turn and between adjacent coil turns. The reference numeral 90 identifies lines for supplying current to the part-coils 83 to 85 and 86 to 88. The current is taken from the supply lines through contact means 91 to 94, whilst current is passed between adjacent coil turns in each part-coil through contact means 95 to 98. As will be seen from the Figure, the part-coils 83 to 85 and 86 to 88 have different winding directions and adjacent ends of the part-coils are connected to, in principle, the same point in the current supply system, whereby the voltage between the coil turns 85 and 86 is constantly zero. The advantages afforded by the method of the present invention will now be illustrated with reference to a number of examples.

EXAMPLE 1:

A bed of coke having a diameter of 7.0 m and a height of about 5 m was maintained at a temperature of about 1000°C in a reactor of the type shown in FIG. 1. From the bottom of the bed coke was continuously fed out at a rate of about 74.5 tons per 24 h, while the bed was continuously replenished by the addition of coal to the top of the bed. The coal, which contained 29% by weight of volatile constituents (calculated on combustible substance) and 12% by weight of ashes, was added at a rate of about 100 tons per 24 h and was coked in the reactor while giving off gases. Energy in an amount of 110 MWh per 24 h was supplied to the coke bed electroinductively at a frequency of 100 Hz by means of an induction coil surrounding the reactor on a level with the coke bed and having a diameter of 7.5 m and a height of 4.5 m. Said energy was sufficient for maintaining the bed temperature and for the coking of the coal. The gas formed amounted to about 60000 Nm$^3$ per 24 h and consisted essentially of hydrogen and hydrocarbons.

EXAMPLE 2:

A gas consisting essentially of 20% by volume of $CO_2$ and the remainder CO and $H_2$ was continuously passed in an amount of about 220000 Nm$^3$ per 24 h through a reactor of the type shown in FIG. 2 and containing an electroinductively heated coke bed as specified in Example 1. The gas supplied to the reactor was preheated to the bed temperature which was about 800°C. The reduced gas leaving the reactor and having passed through the bed consisted of CO, $H_2$ and hydrocarbons and amounted to about 283000 Nm$^3$ per 24 h. Energy in an amount of 100 MWh per 24 h was supplied electroinductively to the coke bed at a frequency of 100 Hz by means of an induction coil as specified in Example 1. To replace the coke consumed, coal of the type specified in Example 1 and in an amount of about 35 tons per 24 h was added to the top of the coke bed and during the same period of time about 4 tons of ashes were removed from the reactor.

EXAMPLE 3:

To an electroinductively heated coke bed as specified in Example 1, contained in a reactor of the type shown in FIG. 3 and held at a temperature of about 1500°C, pre-reduced iron oxide having a composition corresponding substantially to FeO was fed continuously in an amount of 72 tons per 24 h together with coal of the type specified in Example 1 in an amount of 19 tons per 24 h. From the bottom of the reactor molten hot metal (pig iron) in an amount of 55 tons per 24 h and having a carbon content of about 4% by weight was tapped together with molten slag in an amount of 6 tons per 24 h. From the top of the reactor gas comprising essentially hydrocarbons and carbon monoxide was withdrawn in an amount of about 30000 Nm$^3$ per 24 h. To meet the energy demand for maintaining the bed temperature and for effecting the reduction 90 MWh per 24 h was supplied to the coke bed by means of an induction coil as specified in Example 1 at a frequency of 100 Hz.

EXAMPLE 4:

Iron oxide material was reduced as described in Example 3 with the exception that oil in an amount of 20 tons per 24 h was combusted in the reactor above the bed. The demand of electric energy was thereby lowered to 70 MWh per 24 h at the same rate of production of molten hot metal, while at the same time the amount of gas withdrawn from the reactor increased to about 215000 Nm$^3$ per 24 h and said gas consisted mainly of $CO_2$ and $H_2O$.

EXAMPLE 5:

To an electroinductively heated coke bed as specified in Example 1, contained in a reactor of the type shown in FIG. 4 and held at a temperature of about 1500°C, iron scrap containing 90% by weight metallic iron was charged substantially continuously in an amount of about 200 tons per 24 h together with coal of the type specified in Example 1 in an amount of 7 tons per 24 h. From the bottom of the reactor molten hot metal (pig iron) in an amount of about 195 tons per 24 h and about 0.5 tons of slag per 24 h were tapped. From the top of the reactor gas comprising essentially carbon monoxide, hydrogen and hydrocarbons was withdrawn in an amount of about 15000 Nm$^3$ per 24 h. To meet the energy demand for maintaining the bed temperature and for melting the scrap and reducing oxidized portions thereof 96 MWh per 24 h was supplied to the coke bed by means of an induction coil as specified in Example 1 at a frequency of 100 Hz.

EXAMPLE 6:

To an electroinductively heated coke bed as specified in Example 1, contained in a reactor of the type shown in FIG. 5 and held at a temperature of about 1500°C, molten fayalite slag having a temperature of 1450°C and an iron content of about 50% by weight was fed continuously in an amount of about 200 tons per 24 h together with lime in an amount of about 90 tons per 24 h and coal of the type specified in Example 1 in an amount of about 45 tons per 24 h. From the bottom of the reactor molten hot metal (pig iron) in an amount of 97 tons per 24 h was tapped together with molten slag in an amount of about 120 tons per 24 h and having a composition corresponding substantially to wollastonite. From the top of the reactor gas comprising essentially $CO_2$, CO and $H_2$ was withdrawn in an amount of about 64000 $Nm^3$ per 24 h. To meet the energy demand for maintaining the bed temperature and for effecting the reactions 130 MWh per 24 h was supplied to the coke bed by means of an induction coil as specified in Example 1 at a frequency of 100 Hz.

EXAMPLE 7:

To an electroinductively heated coke bed as specified in Example 1, contained in a reactor of the type shown in FIG. 5 and held at a temperature of about 1500°C, slag at a temperature of 1250°C, obtained in electric smelting of copper ore and containing 10% by weight Zn, 2% by weight Pb, 43% by weight FeO and the remainder substantially $SiO_2$ was fed continuously in an amount of about 150 tons per 24 h together with coal of the type specified in Example 1 in an amount of 22 tons per 24 h and lime in an amount of about 110 tons per 24 h. From the bottom of the reactor molten iron in an amount of about 110 tons per 24 h and having a low carbon content and a silicon content varying between 2 to 6 % by weight was tapped together with molten slag in an amount of about 75 tons per 24 h and having a composition corresponding substantially to wollastonite. In the coke bed gas was formed in an amount of about 54000 $Nm^3$ per 24 h. Before being withdrawn from the reactor said gas, which in addition to $H_2$, CO and $CO_2$ contained 13 tons of Zn and 3 tons of Pb in vapor form, was supplied with air for oxidizing the content of Zn and Pb. The metal oxides thus obtained were separated in the form of fine dust from the remainder of the gas in a subsequent steam boiler and gas cleaning system.

The invention is not restricted to the embodiments described with reference to the drawings but may be modified within the scope of the following claims.

1. A method of carrying out heat-requiring processes in a reactor chamber which includes a bed which comprises material taking part in the process, where in at least part of the energy required for said process is generated electroinductively in the bed itself by at least one induction coil through which alternating current is arranged to pass and which is located externally of the reactor chamber, wherein the improvement comprises using a bed having a resistivity ($\rho$) within the range of between $10^{-4}$ and 10 ohm m and a low frequency alternating current which is at most 10 times the mains frequency, and maintaining a relationship between the least cross dimension ($d$) of the bed area and the penetration depth ($\delta$) of the inductive field at a value between 0.2 and 2.5, which also satisfies the relationship $$\frac{d}{\delta} = k (0.54 - 0.35 \cdot {}^{10}\log \rho)$$

where $k$ is a numerical value between 1.1 and 1.5.

2. A method according to claim 1, comprising using a frequency which is a whole-number multiple from 1 to 10 of the mains frequency.

3. A method according to claim 1, comprising supplying to the reactor chamber part of the heat required for the process by combusting burnable substances in said chamber.

4. A method according to claim 1, comprising using a bed material comprising substantially coke.

5. A method according to claim 4, wherein said method is applied in conjunction with the coking of coal which is charged to the reactor chamber, the inductively produced heat being generated in part of the material undergoing coking, which part has been substantially completely freed from gasifiable constituents.

6. A method according to claim 5, comprising discharging the formed coke from the reactor chamber via a liquid lock, in which the coke is cooled.

7. A method according to claim 5, comprising passing at least part of the coking gas through the coked material present in the reactor chamber and maintaining in said material at least the temperature required to crack the coking gas.

8. A method according to claim 4, wherein the method is applied in conjunction with the reduction of a gaseous medium caused to pass through the inductively heated coke bed substantially continuously during progressive consumption of the bed.

9. A method according to claim 8, comprising maintaining the bed temperature at such a magnitude that the slag formed as the coke in the bed is consumed is obtained in the form of a melt at the bottom of the reactor chamber and tapping the slag melt from the reactor chamber.

10. A method according to claim 8 comprising preheating said gaseous medium by indirect heat exchange with the gas already treated in the bed.

11. A method according to claim 8, comprising passing the gas downwardly through coke located in the reactor chamber.

12. A method according to claim 4, wherein the method is applied in conjunction with the reduction of solid, metal oxide containing material charged to the coke bed located in the reactor chamber and in which bed induction currents are generated, and wherein a temperature is maintained in at least the coke bed of such magnitude that the metal oxide containing material during reduction and melting passes through the coke bed during progressive consumption of said bed, and wherein the formed slag and molten reduced material are tapped from the reactor chamber.

13. A method according to claim 12 wherein the metal oxide containing material is an iron oxide material, comprising charging the iron oxide material to the reactor chamber in a pre-reduced stage.

14. A method according to claim 12, comprising charging the metal oxide containing material to the reactor chamber in such a finely divided state that said material is held fluidized by the gases formed in the reactor chamber at least during the initial stages of the reduction of said material.

15. A method according to claim 4, wherein the method is applied in conjunction with the melting of pieces of at least partially metallic material, wherein said material and reducing agent for replacing coke consumed during the process are charged to the reactor, where the material is melted electroinductively and the molten material passes through the inductively heated coke bed during reduction of oxidized portions of the material during progressive consumption of the coke bed, and wherein the molten metal and formed slag are obtained in a zone located beneath the coke bed, from which zone the metal and slag are tapped from the reactor chamber.

16. A method according to claim 12, wherein the solid, metal oxide containing material is pre-heated prior to being charged to the reactor chamber.

17. A method according to claim 4, wherein the method is applied in conjunction with the recovery of at least one metal from a melt containing said metal in oxide bound form, the melt being charged to the coke bed and the residence time for the melt and the temperature of the coke bed being adjusted so that said oxide bound metal is reduced out during progressive consumption of the coke bed and is obtained in molten form in a zone located beneath the coke bed, from which zone the metal and newly formed and residual slag are tapped from the reactor chamber.

18. A method according to claim 4, wherein the method is applied in conjunction with the recovery of at least one metal from a melt, containing said metal in oxide or sulphide form, said metal being relatively easily volatilized in both elementary and sulphide forms the melt being caused to pass through the inductively heated coke bed and the residence time for the melt and the temperature of the coke bed being adjusted so that any such metal present in the oxide form is reduced and the metal volatilized and any metal present in the sulphide form volatilized during progressive consumption of the coke bed.

19. A method according to claim 18 wherein the melt also includes at least one oxide-bound, relatively difficultly volatilized metal wherein the residence time for the melt and the temperature of the coke bed are adjusted so that said oxide bound metal is reduced out during progressive consumption of the coke bed and is obtained in molten form in a zone located beneath the bed, from which zone the reduced molten metal and treated melt are tapped from the reactor chamber.

20. A method according to claim 4, wherein a layer of molten slag is retained beneath the coke bed, and wherein heat is generated inductively also in the slag melt.

21. A method according to claim 4, wherein the coke in the coke bed is progressively consumed during the process, and is replaced substantially continuously.

22. A method according to claim 21, wherein coke for replacing consumed coke in the bed is produced in the reactor chamber by charging coal to said chamber and coking said coal therein.

23. A method according to claim 22, wherein the coal is pre-heated, during the initial stage of the coking process, by combusting burnable substances in the reactor chamber, and wherein the heat of the combustion gases is transferred to the coal by radiation and convection.

24. A method according to claim 22, wherein hydrocarbons are introduced to the reactor chamber.

25. A method according to claim 24, comprising contacting hydrocarbons with the bed material and maintaining in said material a temperature of at least such magnitude that the hydrocarbons are cracked to cause carbon to precipitate onto the coke in the bed.

26. A method according to claim 3, wherein the heat which is generated with said combustion of said burnable substances and which is not taken up by the material in the reactor chamber is recovered in said chamber in a radiation portion of a steam boiler arranged adjacent said reactor, said radiation portion being arranged in said reactor chamber.

27. A method according to claim 21, wherein combustible gases formed in the reactor chamber are at least partially used to produce energy.

28. A method according to claim 27, wherein the produced electrical energy is used to supply energy to the process.

29. A method according to claim 1 effected in a reactor, the reactor chamber of which is defined by wall members which separate the induction coil from said chamber and have a certain degree of gas permeability, wherein there is passed to said wall members a gas which is under a pressure which exceeds the highest pressure prevailing in the zone of said chamber located opposite the induction coil and which is unable to establish electric conducting connection between the coil turns.

30. A method according to claim 29, wherein the gas under pressure passed to the wall members is prevented from flowing out through said wall members in a direction away from said chamber.

31. A method according to claim 30, wherein at least a portion of the reactor covered by the induction coil is enclosed in a pressure chamber.

32. A method according to claim 31, wherein the gas is passed to said wall members via said pressure chamber.

33. A method according to claim 30, wherein the regions between adjacent coil turns are sealed against the atmosphere surrounding the reactor, and wherein the gas is supplied inwardly of said sealed regions.

34. A method according to claim 29, wherein there is used an induction coil constructed of a plurality of elements each of which encircles said apparatus through at most 180°.

35. A method according to claim 29, wherein there is used an induction coil constructed of a plurality of part-coils.

36. A method according to claim 29, wherein each coil turn is arranged in one plane.

37. A method according to claim 35, wherein adjacent partcoils are given different winding directions, and wherein adjacent ends of adjacent part-coils are connected to the same point in the current supply system.

38. A method according to claim 1, comprising using a frequency which is at most five times the mains frequency.

39. A method according to claim 1, wherein the numerical value of k is about 1.2.

40. A method according to claim 5, wherein the coal is charged substantially continuously to the reactor chamber.

41. A method according to claim 7, comprising passing the coking gas downwardly through the coked material.

42. A method according to claim 8, wherein the gaseous medium is simultaneously carbureted in said bed.

43. A method according to claim 12, wherein the molten reduced material and the slag formed are tapped off individually.

44. A method according to claim 12, comprising transforming the reduced, metal oxide containing material at least partially into metal carbide in said bed.

45. A method according to claim 12, wherein said metal oxide is iron oxide or calcium oxide.

46. A method according to claim 13, wherein the iron oxide material is pre-reduced to at least FeO.

47. A method according to claim 15, wherein the molten metal and the slag formed are tapped off individually.

48. A method according to claim 15, wherein said pieces of material consists of at least one material selected from the group consisting of pre-reduced metal oxide, sponge iron, metal scrap and lathe turnings.

49. A method according to claim 15, wherein said molten metal is carbonized in the coke bed.

50. A method according to claim 15, wherein the solid, metallic material is pre-heated prior to being charged to the reactor chamber.

51. A method according to claim 17, wherein the molten metal and the slag are tapped off individually.

52. A method according to claim 17, wherein said melt is a molten slag.

53. A method according to claim 18, wherein said at least one metal is selected from the group consisting of zinc, lead, arsenic, antimony, cadmium and tin.

54. A method according to claim 18, wherein said melt is a slag obtained when smelting copper ore.

55. A method according to claim 18, wherein the volatilized substance is oxidized by oxidizing combustion of burnable substances in the reactor chamber and is recovered in oxide form from the combustion gases externally of the reactor.

56. A method according to claim 19, wherein the volatilized substance is discharged from the reactor chamber and is recovered by condensing the same externally of said reactor chamber.

57. A method according to claim 19, wherein the molten metal and said treated melt are tapped off individually.

58. A method according to claim 27, wherein electrical energy is produced by means of an apparatus selected from the group comprising steam turbines, gas turbines and hot air turbines.

* * * * *